Aug. 19, 1941.   R. E. SHELDON   2,253,096
MECHANICAL HORSE
Filed Sept. 26, 1939   4 Sheets-Sheet 2
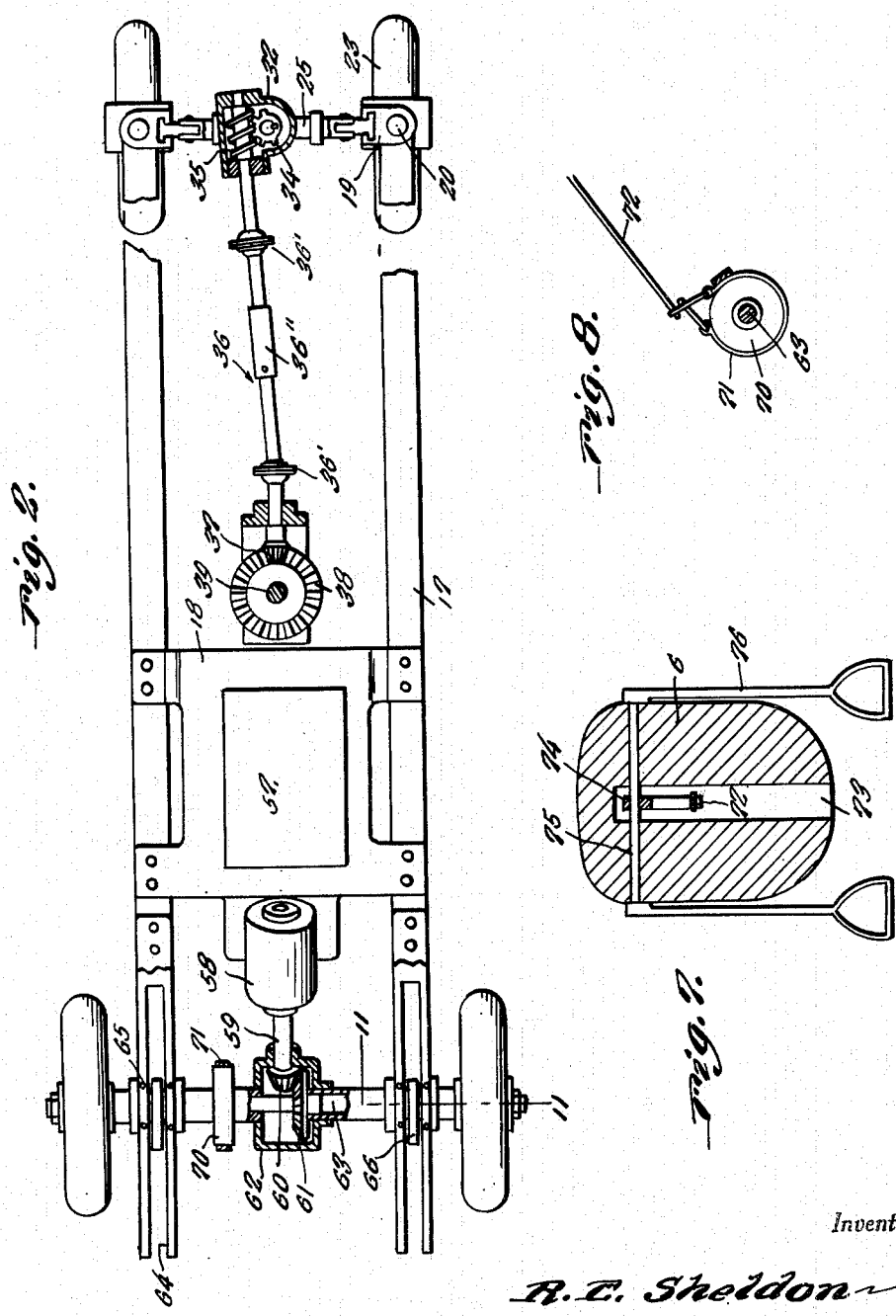

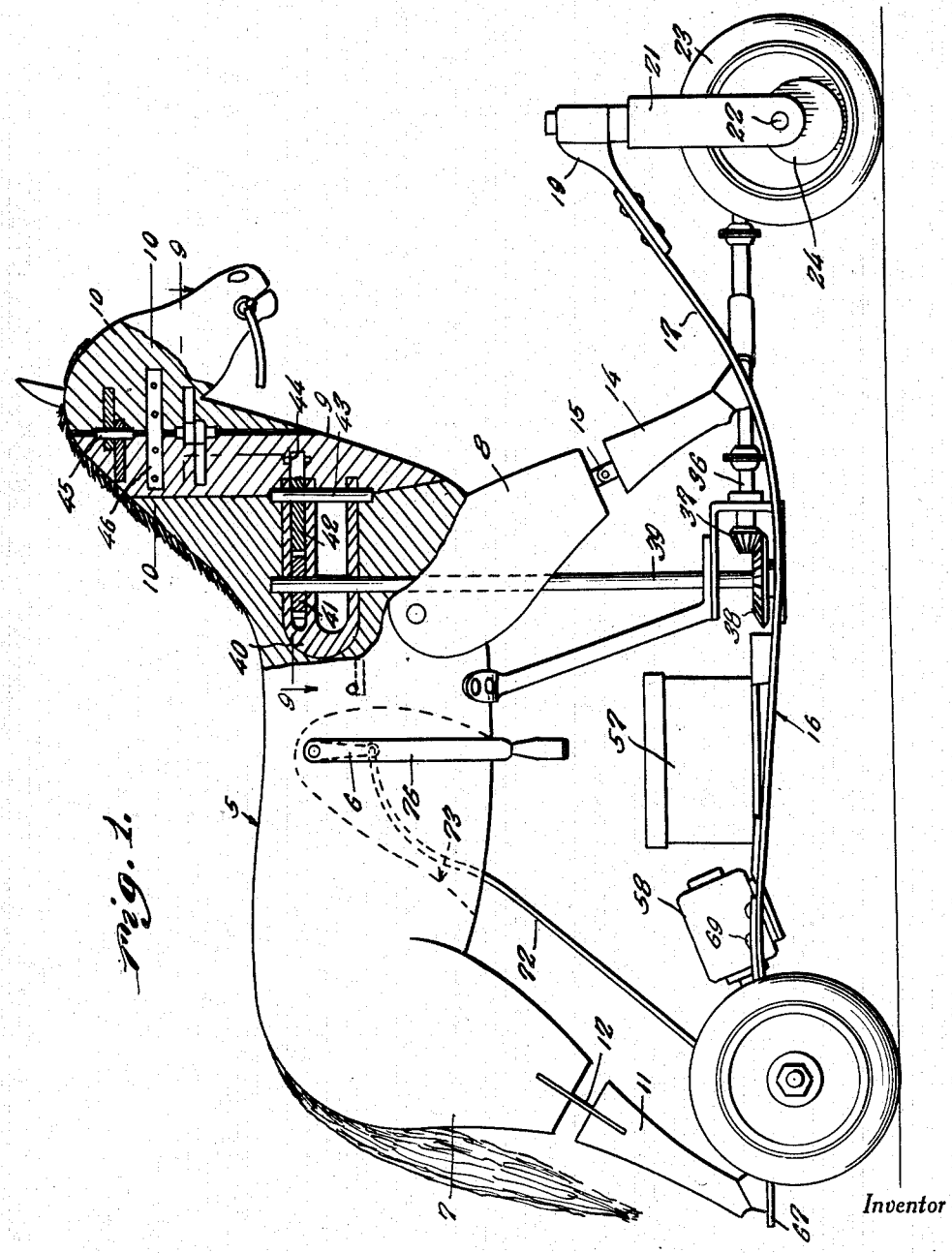

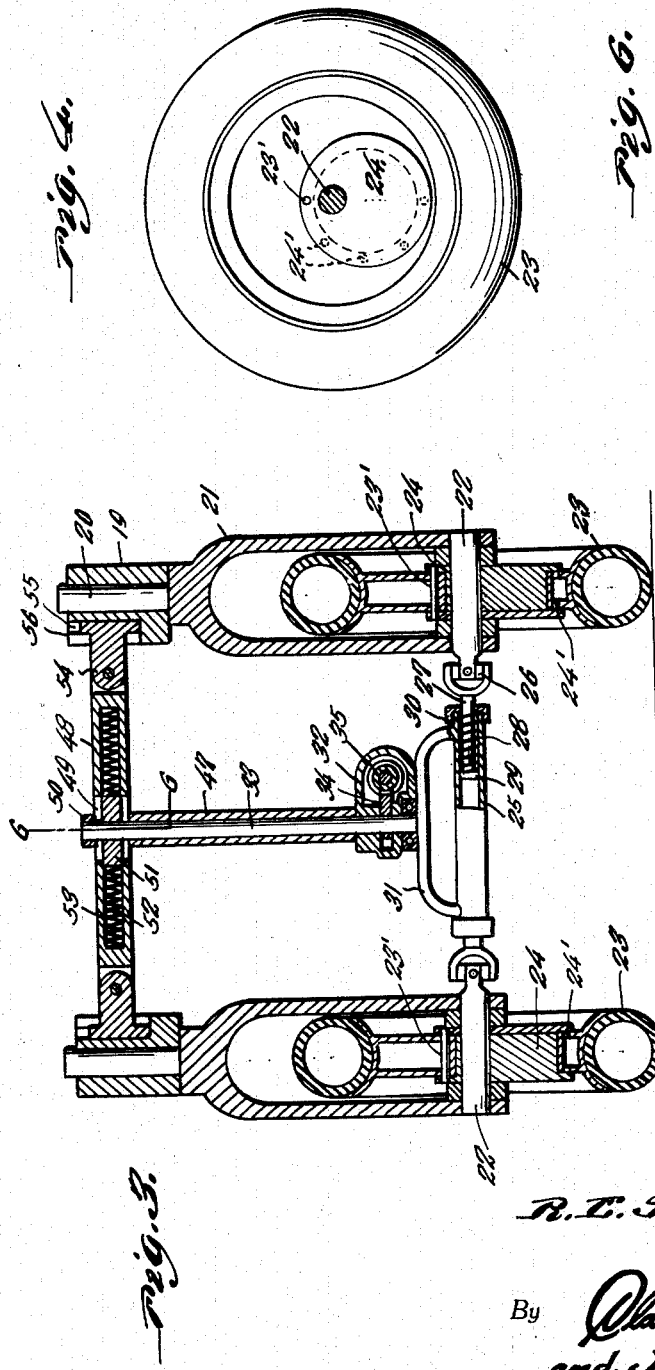

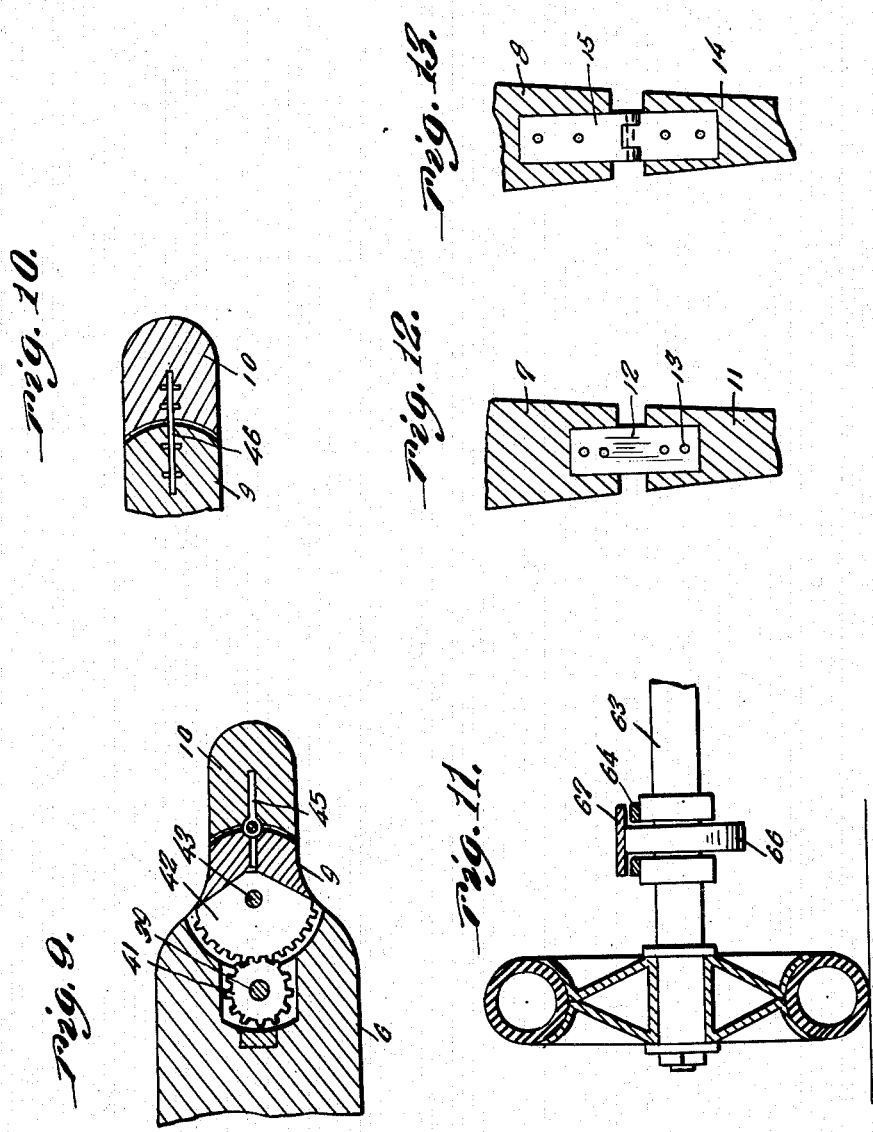

Patented Aug. 19, 1941

2,253,096

UNITED STATES PATENT OFFICE 2,253,096

MECHANICAL HORSE

Roy E. Sheldon, Ocean Park, Wash.

Application September 26, 1939, Serial No. 296,651

9 Claims. (Cl. 280—1.15)

The present invention relates to a mechanical horse and has for its primary object to provide a device of this character mounted upon wheels and having drive means for operating the rear wheels of the device and also providing a steering mechanism for the front wheels of the device controlled through manipulation of the head of the animal.

A further object of the invention is to provide an eccentric mounting for the front wheels of the device as well as an eccentric connection between the rear legs of the animal and the rear axles to provide a movement of the horse simulating that of a natural animal.

A still further object of the invention is to provide brake means operated by the manipulation of the stirrups.

A still further object is to provide apparatus of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof wherein like numerals refer to like parts throughout and in which—

Figure 1 is a side elevational view with parts broken away and shown in section.

Figure 2 is a top plan view of the frame of the device also with parts broken away and shown in section.

Figure 3 is a vertical transverse sectional view through the front wheels of the device.

Figure 4 is a side elevational view of one of the front wheels.

Figure 5 is a detail of the rheostat controlling the electric motor.

Figure 6 is a fragmentary sectional view taken substantially on a line 6—6 of Figure 3.

Figure 7 is a transverse sectional view through the body of the device and showing the brake control mechanism connected with the stirrups.

Figure 8 is a detail of the brake drum.

Figures 9 and 10 are fragmentary sectional views taken substantially on the lines 9—9 and 10—10 respectively of Figure 1.

Figure 11 is a sectional view through one of the rear wheels taken substantially on a line 11—11 of Figure 2.

Figure 12 is a fragmentary vertical sectional view through the hinged connection for the rear legs of the animal, and Figure 13 is a similar view of the front legs thereof.

Referring now to the drawings in detail wherein for the purpose of illustration I have disclosed a preferred embodiment of the invention, the numeral 5 designates the mechanical horse generally which includes the body 6, the rear legs 7, front legs 8, neck 9 and head 10. The rear legs 7 include a lower section 11 connected to the upper portion of the legs by means of a resilient metallic strap 12 having its opposite ends embedded and secured in the respective leg sections by rivets 13.

The front legs also include a lower section 14 connected to the upper section of the legs by hingedly connected plates 15 which are likewise embedded in the respective sections of the legs. The flexible plate 12 and the hinged plates 15 are arranged to provide for the longitudinal movement of the body 6 relative to the lower leg sections of the horse.

The legs of the horse are supported upon a metal frame 16 which includes a pair of flat longitudinally extending spring steel frame members 17 and a transversely extending connecting frame member 18. The front ends of the frame members 17 are riveted or otherwise secured to collars 19 rotatably mounted on upstanding pins 20 projecting upwardly from front wheel yokes 21 supported on stub axles 22 upon which the adjustable eccentric hubs 24 for the front wheels 23, are rotatably mounted. The hubs 24 are movable disks eccentrically mounted in the front wheels and are adjusted to greater or lesser degrees of eccentricity by removing the adjustment pins 23', each of which is placed in a hole in a hub 24 and any one of a plurality of holes 24' in the inner circumference of the wheel. Thus by removing a pin 23' and then turning the hub 24 counter-clockwise and then reinserting the pin in another hole the position of the axle may be regulated to center of wheel or to any desired degree of off-center. Each wheel must be regulated independently of the other thereby simulating a trot, lope or gallop action in the mechanical horse.

The inner ends of each of the stub axles 22 are connected to an axle housing 25 by means of universal joints 26, the universal joints including a rod 27 slidably inserted in the housing 25, the rod being yieldably urged inwardly by means of a coil spring 28, one end of the spring abutting a flange 29 on the inner end of the rod 27 and the other end of the spring being held in position by a cap 30 threaded on the end of the housing.

Formed on the housing 25 is a support 31 and above which is positioned a gear housing 32 and within which is journaled the lower end of a steering post 33 rising from the support 31. Keyed on the post is a worm gear 34 operatively engaged by a worm 35 formed on the forward end of a sectional shaft 36, the rear end of said shaft having a bevel gear 37 operatively engaged by a pinion 38 which is secured on the lower end of a vertical shaft 39 rising upwardly into the body 6.

The sections of shaft 36 have portions connected together by universal joints as shown at 36' and the central sections have their adjacent ends splined together as shown generally at 36".

The upper end of the shaft 39 is journaled in a casting 40 recessed in the front end of the body 6 and secured to the upper end of the shaft is a gear 41 driven by a gear segment 42 journaled on a pin 43, the segment including an extension 44 anchored in the neck 9 of the horse.

The head 10 is pivotally connected to the neck portion 9 by means of hinge members 45 and having its ends embedded in the neck and the head is a leaf spring 46 adapted to yieldably return the head and neck into a forwardly aligned position.

Surrounding the upper portions of the steering post 33 is a housing 47 having its upper ends engaged by a cross-bar 48 provided with a slotted opening 49 through which the shaft 33 extends, the cross-bar being anchored in position by means of a collar 50 secured to the upper end of said steering post. Bearing blocks 51 are slidably mounted in recesses 52 formed in the cross-bar 48 and projected against opposite sides of the steering post by means of coil springs 53 to brace the upper end of the post and at the same time permit the necessary movement of the cross-bar. At each end of the cross-bar 48 is a pivoted extension 54 having flanges 55 slidably mounted in a guide 56 formed on one side of the adjacent collar 19.

From the foregoing it will be apparent that the steering of the front end of the horse is accomplished by means of the turning movement of the head 10 which transmits such motion through the neck 9 to the gear segment 42, then through the gear 41, the shaft 39, and the shaft 36 to the worm 35. From the worm 35 the steering movement is transmitted to the steering post 33 and the support 31 which turns the wheels through its connection with the stub axles 22. The cross-bar 48 at the upper end of the steering post 33 serves to support the wheels in an upright position while at the same time permitting independent vertical movement of each wheel due to the pivotal connection of each end of the bar 48 with the extensions 54, which latter are slidably carried at the top of the wheel yokes 21.

Mounted on the cross-frame member 18 is a storage battery 57 for driving an electric motor 58 from which the shaft 59 extends through the pinion 60 for driving the gear 61 mounted in the housing 62 and within which the rear axle 63 is journaled.

The rear ends of the longitudinal frame members 17 are bifurcated as shown at 64 and secured to the rear axle housing by bolts or the like 65. Secured to the rear axle 63 and positioned within the furcations of the extension 64 are eccentrics 66 underlying plates 67 on which the rear legs 7 are supported, the front ends of the plates being riveted to the longitudinal frame member 17 by rivets 69.

Also secured to the rear axle 63 is a brake drum 70 with which is operatively engaged a brake band 71 arranged for operation by a brake rod 72 extending upwardly into a recess 73 formed in the underside of the body 6 and connected to an arm 74 secured on a cross-rod 75 extending transversely of the body and to the outer ends of which are secured the stirrups 76. Accordingly upon a forward swinging movement of the stirrups 76 the brake band 71 will be applied to cause a braking action upon the rear axle 63.

The electric motor 58 is controlled by means of a rheostat 77 arranged in a recess 78 in the body and controlled by a lever 79 projecting outwardly of the body adjacent the stirrups 76.

From the foregoing it will be apparent the movement of the vehicle will cause a vertical movement of the legs of the horse substantially in simulation of the motion of a living animal.

It is believed the details of construction and manner of operation of the device will be readily understood from the foregoing without further detailed explanation.

What is claimed is:

1. A mechanical horse comprising a frame, front and rear wheels supporting the frame, a steering mounting for the front wheels, stub axles for the front wheels, universal connections between the axles and the mounting providing independent bodily movement for each wheel, a steering mechanism for said axles, an eccentric hub for the wheels, a mounting for each wheel rising from the axle and means connecting the upper ends of the last-named mountings for maintaining the same in an upright position during independent bodily movement of the wheels.

2. A mechanical horse comprising a frame, front and rear wheels supporting the frame, a steering mounting for the front wheels, stub axles for the front wheels, universal connections between the axles and the mounting providing independent bodily movement for each wheel, a steering mechanism for said axles, including an upstanding steering post connected at its lower end with the axles, an eccentric hub for the wheels, a mounting for each wheel rising from each axle and means connecting the upper ends of the last-named mountings and the steering post for maintaining the same in an upright position during independent bodily movement of the wheels.

3. A mechanical horse comprising a frame, front and rear wheels supporting the frame, a steering mounting for the front wheels, stub axles for the front wheels, universal connections between the axles and the mounting providing independent bodily movement for each wheel, a steering mechanism for the mounting, including an upstanding steering post, a yieldable and pivotal connection between the respective axles and the lower end of the post, an eccentric hub for the wheels, a mounting for each wheel rising from each axle and means connecting the upper ends of the last-named mountings and the steering post for maintaining the same in an upright position during independent bodily movement of the wheels.

4. A mechanical horse comprising a frame, wheels supporting the front and rear ends of the frame, stub axles for each front wheel, a steering mounting, universal connections between each axle and the mounting providing for independent bodily movement of each front wheel, means for steering the wheels through the mounting and means for maintaining the wheels in steering relation and comprising a yoke rising from each axle and a cross member connecting the upper ends of the yokes.

5. A mechanical horse comprising a frame, wheels supporting the front and rear ends of the frame, stub axles for each front wheel, a steering mounting, universal connections between each axle and the mounting providing for independent bodily movement of each front wheel, means for steering the wheels through the mounting and means for maintaining the wheels in steering relation and comprising a yoke rising from each axle, and a cross member pivotally connected at each end to the upper portion of each yoke.

6. A mechanical horse comprising a frame, wheels supporting the front and rear ends of the frame, stub axles for each front wheel, a steering mounting, universal connections between each axle and the mounting providing for independent bodily movement of each front wheel, means for steering the wheels through the mounting and means for maintaining the wheels in steering relation and comprising a yoke rising from each axle, a collar rotatably mounted on a vertical axis at the upper portion of each yoke and a cross member pivotally connected at each end to said collars.

7. A mechanical horse comprising a frame, wheels supporting the front and rear ends of the frame, stub axles for each front wheel, a steering mounting including an upstanding steering post, universal connections between each axle and the mounting providing for independent bodily movement of each front wheel, means for steering the wheels through the mounting and means for maintaining the wheels in steering relation and comprising a yoke rising from each axle, a collar rotatably mounted on a vertical axis at the upper portions of each yoke, a cross-member pivotally connected at each end to said collars and a yieldable connection between the upper portion of the steering post and an intermediate part of the cross member.

8. A mechanical horse comprising a frame, wheels supporting the front and rear ends of the frame, stub axles for each front wheel, a steering mounting including an upstanding steering post, universal connections between each axle and the mounting providing for independent bodily movement of each front wheel and means for steering the front wheels comprising a pivoted head for the horse and a shaft and gear operating connection between the head and the steering post.

9. A mechanical horse comprising a frame, front and rear wheels supporting the frame, an axle for the rear wheels, a pair of leaf spring supports each having one end secured to the frame and their other ends secured to the rear legs of the horse, cam devices mounted on the axle engaging the said supports to actuate the same and drive means for the axle.

ROY E. SHELDON.